(12) United States Patent
Tyler et al.

(10) Patent No.: US 10,843,406 B2
(45) Date of Patent: Nov. 24, 2020

(54) ADDITIVE MANUFACTURING SYSTEM HAVING MULTI-FLEX NOZZLE

(71) Applicant: CC3D LLC, Coeur d'Alene, ID (US)

(72) Inventors: Kenneth L. Tyler, Coeur d'Alene, ID (US); Ryan C Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 463 days.

(21) Appl. No.: 15/789,251

(22) Filed: Oct. 20, 2017

(65) Prior Publication Data

US 2018/0126640 A1    May 10, 2018

Related U.S. Application Data

(60) Provisional application No. 62/417,709, filed on Nov. 4, 2016.

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/106* (2017.08); *B29C 64/118* (2017.08); *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08); *B29C 64/307* (2017.08); *B29C 64/336* (2017.08); *B29C 64/379* (2017.08); *B29C 64/386* (2017.08); *B29C 64/393* (2017.08);

*B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); *B29C 31/042* (2013.01); *B29C 35/0261* (2013.01);
(Continued)

(58) Field of Classification Search
None
See application file for complete search history.

(56) References Cited

U.S. PATENT DOCUMENTS 3,286,305 A    11/1966   Seckel
3,809,514 A    5/1974    Nunez
(Continued)

FOREIGN PATENT DOCUMENTS

CN    203766033 U    8/2014
DE    4102257 A1     7/1992
(Continued)

OTHER PUBLICATIONS

International Search Report dated Jan. 12, 2018 for PCT/US2017/059671 to CC3D LLC Filed Nov. 1, 2017.
(Continued)

*Primary Examiner* — Seyed Masoud Malekzadeh
*Assistant Examiner* — Manley L Cummins, IV
(74) *Attorney, Agent, or Firm* — Ryan C. Stockett (57) ABSTRACT

A head is disclosed for use with an additive manufacturing system. The head may include a matrix reservoir, and a plurality of nozzles simultaneously fluidly connected to the matrix reservoir. The head may also include at least one hinge connecting the plurality of nozzles.

16 Claims, 3 Drawing Sheets

(51) Int. Cl.

| | |
|---|---|
| *B33Y 50/02* | (2015.01) |
| *B33Y 40/00* | (2020.01) |
| *B29C 64/118* | (2017.01) |
| *B29C 64/386* | (2017.01) |
| *B29C 64/20* | (2017.01) |
| *B29C 64/393* | (2017.01) |
| *B29C 64/106* | (2017.01) |
| *B29C 70/38* | (2006.01) |
| *B29C 64/291* | (2017.01) |
| *B29C 64/245* | (2017.01) |
| *B29C 64/141* | (2017.01) |
| *B29C 64/264* | (2017.01) |
| *B29C 64/307* | (2017.01) |
| *B29C 64/379* | (2017.01) |
| *B29C 64/336* | (2017.01) |
| *B29C 64/165* | (2017.01) |
| *B29C 64/227* | (2017.01) |
| *B29C 64/40* | (2017.01) |
| *B33Y 10/00* | (2015.01) |
| *B29C 35/08* | (2006.01) |
| *B29C 35/02* | (2006.01) |
| *B29K 105/08* | (2006.01) |
| *B29B 15/12* | (2006.01) |
| *B29C 70/52* | (2006.01) |
| *B29C 31/04* | (2006.01) |
| *B29C 64/259* | (2017.01) |
| *B33Y 70/00* | (2020.01) |
| *B29C 64/295* | (2017.01) |

(52) U.S. Cl.
CPC .......... *B29C 64/259* (2017.08); *B29C 64/295* (2017.08); *B29C 70/524* (2013.01); *B29C 2035/0827* (2013.01); *B29C 2035/0855* (2013.01); *B29K 2105/08* (2013.01); *B33Y 10/00* (2014.12); *B33Y 70/00* (2014.12)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,470,790 A * | 9/1984 | Harada | B29C 48/30 425/192 R |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,266,021 A * | 11/1993 | Jacobson | B29C 55/00 425/334 |
| 5,296,335 A | 3/1994 | Thomas et al. | |
| 5,340,433 A | 8/1994 | Crump | |
| 5,503,785 A * | 4/1996 | Crump | B33Y 10/00 264/40.7 |
| 5,633,021 A * | 5/1997 | Brown | B29C 41/36 425/375 |
| 5,746,967 A | 5/1998 | Hoy et al. | |
| 5,866,058 A | 2/1999 | Batchelder et al. | |
| 5,936,861 A | 8/1999 | Jang et al. | |
| 6,129,872 A | 10/2000 | Jang | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,827,684 B1 * | 9/2014 | Schumacher | B29C 64/20 425/375 |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 9,808,986 B2 * | 11/2017 | Toh | B29C 64/20 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104248 A1 * | 5/2005 | Younie | B29C 33/3821 264/219 |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228590 A1 * | 10/2007 | LaBossiere | B33Y 30/00 264/40.1 |
| 2007/0228592 A1 | 10/2007 | Dunn et al. | |
| 2008/0176092 A1 | 7/2008 | Owens | |
| 2009/0035405 A1 * | 2/2009 | Leavitt | B28B 1/14 425/97 |
| 2009/0095410 A1 | 4/2009 | Oldani | |
| 2009/0289384 A1 | 11/2009 | Maalderink et al. | |
| 2010/0021580 A1 * | 1/2010 | Swanson | B29C 31/042 425/132 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0242317 A1 * | 9/2013 | Leavitt | B41J 29/393 358/1.8 |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0070461 A1 * | 3/2014 | Pax | B33Y 50/02 264/401 |
| 2014/0159284 A1 | 6/2014 | Leavitt | |
| 2014/0232035 A1 | 8/2014 | Bheda | |
| 2014/0242208 A1 | 8/2014 | Elsworthy | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0352790 A1 | 12/2015 | Hadas | |

(56) References Cited

U.S. PATENT DOCUMENTS

| | | | |
|---|---|---|---|
| 2015/0367576 A1* | 12/2015 | Page | G05B 15/02 |
| | | | 264/257 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0075089 A1 | 3/2016 | Royo et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0176112 A1 | 6/2016 | Liu | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271367 A1* | 9/2016 | Hyde | A61L 27/3633 |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0021565 A1 | 1/2017 | Deaville | |
| 2017/0028434 A1 | 2/2017 | Evans et al. | |
| 2017/0028588 A1 | 2/2017 | Evans et al. | |
| 2017/0028617 A1 | 2/2017 | Evans et al. | |
| 2017/0028619 A1 | 2/2017 | Evans et al. | |
| 2017/0028620 A1 | 2/2017 | Evans et al. | |
| 2017/0028621 A1 | 2/2017 | Evans et al. | |
| 2017/0028623 A1 | 2/2017 | Evans et al. | |
| 2017/0028624 A1 | 2/2017 | Evans et al. | |
| 2017/0028625 A1 | 2/2017 | Evans et al. | |
| 2017/0028627 A1 | 2/2017 | Evans et al. | |
| 2017/0028628 A1 | 2/2017 | Evans et al. | |
| 2017/0028633 A1 | 2/2017 | Evans et al. | |
| 2017/0028634 A1 | 2/2017 | Evans et al. | |
| 2017/0028635 A1 | 2/2017 | Evans et al. | |
| 2017/0028636 A1 | 2/2017 | Evans et al. | |
| 2017/0028637 A1 | 2/2017 | Evans et al. | |
| 2017/0028638 A1 | 2/2017 | Evans et al. | |
| 2017/0028639 A1 | 2/2017 | Evans et al. | |
| 2017/0028640 A1* | 2/2017 | Harrison | B29C 69/001 |
| 2017/0028644 A1 | 2/2017 | Evans et al. | |
| 2017/0030207 A1 | 2/2017 | Kittleson | |
| 2017/0036403 A1 | 2/2017 | Ruff et al. | |
| 2017/0050340 A1 | 2/2017 | Hollander | |
| 2017/0057164 A1 | 3/2017 | Hemphill et al. | |
| 2017/0057165 A1 | 3/2017 | Waldrop et al. | |
| 2017/0057167 A1 | 3/2017 | Tooren et al. | |
| 2017/0057181 A1 | 3/2017 | Waldrop et al. | |
| 2017/0064840 A1 | 3/2017 | Espalin et al. | |
| 2017/0066187 A1 | 3/2017 | Mark et al. | |
| 2017/0087768 A1 | 3/2017 | Bheda | |
| 2017/0106565 A1 | 4/2017 | Braley et al. | |
| 2017/0120519 A1 | 5/2017 | Mark | |
| 2017/0129170 A1 | 5/2017 | Kim et al. | |
| 2017/0129171 A1 | 5/2017 | Gardner et al. | |
| 2017/0129176 A1 | 5/2017 | Waatti et al. | |
| 2017/0129182 A1 | 5/2017 | Sauti et al. | |
| 2017/0129186 A1 | 5/2017 | Sauti et al. | |
| 2017/0144375 A1 | 5/2017 | Waldrop et al. | |
| 2017/0151728 A1 | 6/2017 | Kunc et al. | |
| 2017/0157828 A1 | 6/2017 | Mandel et al. | |
| 2017/0157831 A1 | 6/2017 | Mandel et al. | |
| 2017/0157844 A1 | 6/2017 | Mandel et al. | |
| 2017/0157851 A1 | 6/2017 | Nardiello et al. | |
| 2017/0165908 A1 | 6/2017 | Pattinson et al. | |
| 2017/0173868 A1 | 6/2017 | Mark | |
| 2017/0182712 A1 | 6/2017 | Scribner et al. | |
| 2017/0210074 A1 | 7/2017 | Ueda et al. | |
| 2017/0217088 A1 | 8/2017 | Boyd et al. | |
| 2017/0232674 A1 | 8/2017 | Mark | |
| 2017/0232679 A1* | 8/2017 | Gardiner | B33Y 70/00 |
| | | | 425/162 |
| 2017/0259502 A1 | 9/2017 | Chapiro et al. | |
| 2017/0259507 A1 | 9/2017 | Hocker | |
| 2017/0266876 A1 | 9/2017 | Hocker | |
| 2017/0274585 A1 | 9/2017 | Armijo et al. | |
| 2017/0284876 A1 | 10/2017 | Moorlag et al. | |
| 2017/0361497 A1* | 12/2017 | Crescenti Savall | B33Y 10/00 |

FOREIGN PATENT DOCUMENTS

| | | | |
|---|---|---|---|
| DE | 102012210203 A1 * | 12/2013 | B60S 1/3877 |
| EP | 2589481 B1 | 1/2016 | |
| EP | 3219474 A1 | 9/2017 | |
| KR | 100995983 B1 | 11/2010 | |
| KR | 101172859 B1 | 8/2012 | |
| WO | 2013017284 A2 | 2/2013 | |
| WO | 2016088042 A1 | 6/2016 | |
| WO | 2016088048 A1 | 6/2016 | |
| WO | 2016110444 A1 | 7/2016 | |
| WO | 2016159259 A1 | 10/2016 | |
| WO | 2016196382 A1 | 12/2016 | |
| WO | 2017006178 A1 | 1/2017 | |
| WO | 2017006324 A1 | 1/2017 | |
| WO | 2017051202 A1 | 3/2017 | |
| WO | 2017081253 A1 | 5/2017 | |
| WO | 2017085649 A1 | 5/2017 | |
| WO | 2017087663 A1 | 5/2017 | |
| WO | 2017108758 A1 | 6/2017 | |
| WO | 2017122941 A1 | 7/2017 | |
| WO | 2017122942 A1 | 7/2017 | |
| WO | 2017122943 A1 | 7/2017 | |
| WO | 2017123726 A1 | 7/2017 | |
| WO | 2017124085 A1 | 7/2017 | |
| WO | 2017126476 A1 | 7/2017 | |
| WO | 2017126477 A1 | 7/2017 | |
| WO | 2017137851 A2 | 8/2017 | |
| WO | 2017142867 A1 | 8/2017 | |
| WO | 2017150186 A1 | 9/2017 | |

OTHER PUBLICATIONS

A. Di. Pietro & Paul Compston, Resin Hardness and Interlaminar Shear Strength of a Glass-FibreAtinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

(56) References Cited

OTHER PUBLICATIONS

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-FibreNinyiester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bisrnaleirnide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM HAVING MULTI-FLEX NOZZLE

RELATED APPLICATIONS

This application is based on and claims the benefit of priority from U.S. Provisional Application No. 62/417,709 that was filed on Nov. 4, 2016, the contents of which are expressly incorporated herein by reference.

TECHNICAL FIELD

The present disclosure relates generally to a manufacturing system and, more particularly, to an additive manufacturing system having a multi-flex nozzle.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) and/or diversity required for some applications. In addition, during conventional multi-fiber pultrusion, a speed of fabricating complex structures may be prohibitively slow.

The disclosed system is directed at addressing one or more of the problems set forth above and/or other problems of the prior art.

SUMMARY

In one aspect, the present disclosure is directed to a head for an additive manufacturing system. The head may include a matrix reservoir, and a plurality of nozzles simultaneously fluidly connected to the matrix reservoir. The head may also include at least one hinge connecting the plurality of nozzles.

In another aspect, the present disclosure is directed to another head for an additive manufacturing system. This head may include a matrix reservoir, and a plurality of channels simultaneously fluidly connected to the matrix reservoir. The head may further include at least one hinge connecting the plurality of channels, and a flexible membrane at least partially surrounding the plurality of channels.

In yet another aspect, the present disclosure is directed to an additive manufacturing system. The additive manufacturing system may include a moveable support, a matrix reservoir connected to an end of the moveable support, and a plurality of channels simultaneously fluidly connected to an end of the matrix reservoir opposite the moveable support. The additive manufacturing system may also include at least one hinge connecting the plurality of channels, at least one actuator configured to move the plurality of channels about the at least one hinge, and a flexible membrane at least partially surrounding the plurality of channels. The additive manufacturing system may further include at least one cure enhancer mounted adjacent the plurality of channels, and a controller in communication with moveable support, the at least one actuator, and the at least one cure enhancer. The controller may be configured to regulate operation of the moveable support, the at least one actuator, and the at least one cure enhancer based on known specifications for a structure to be fabricated by the additive manufacturing system.

DETAILED DESCRIPTION

Figure 1:
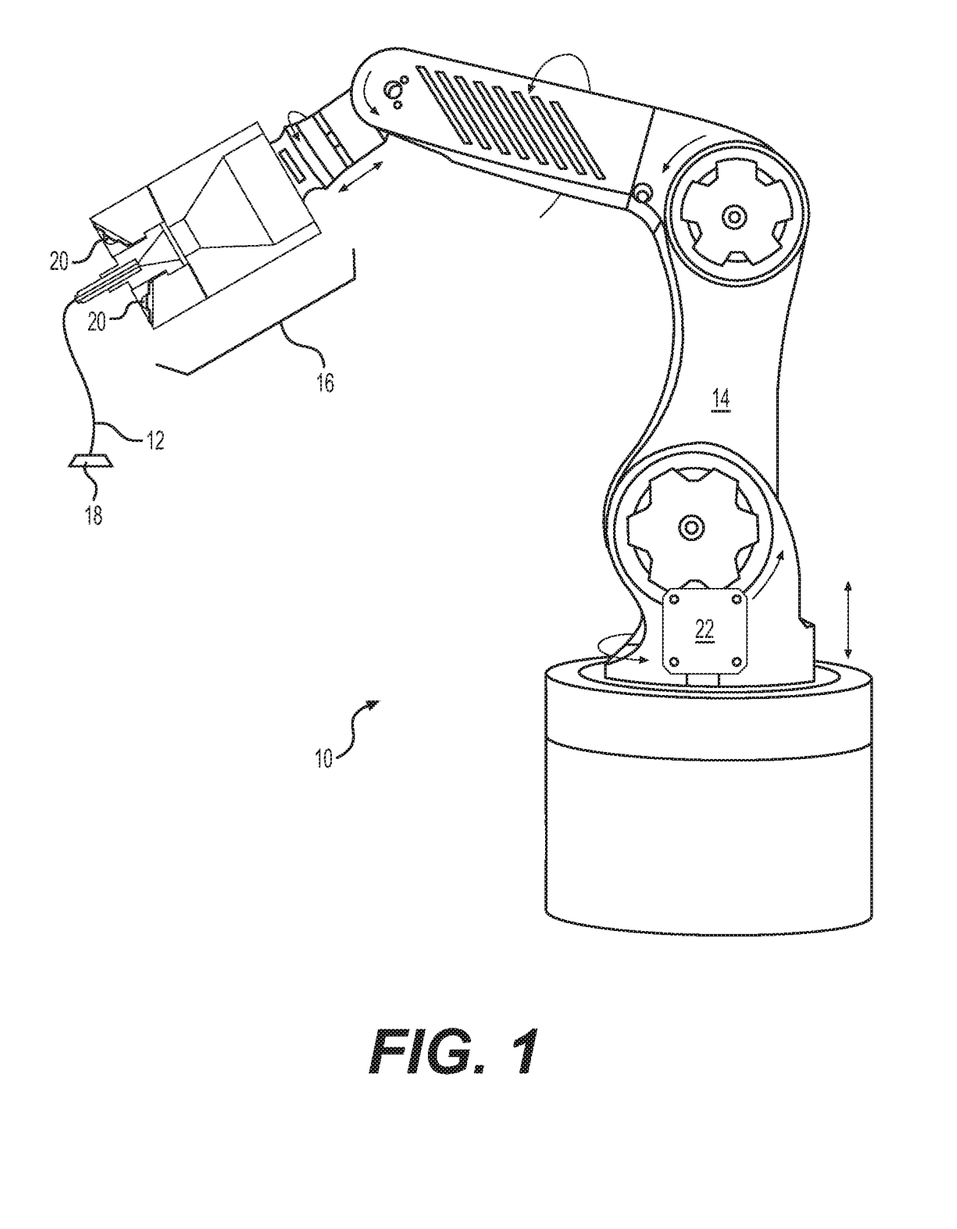
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16 (e.g., as a pre-preg material), and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired compacting and curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
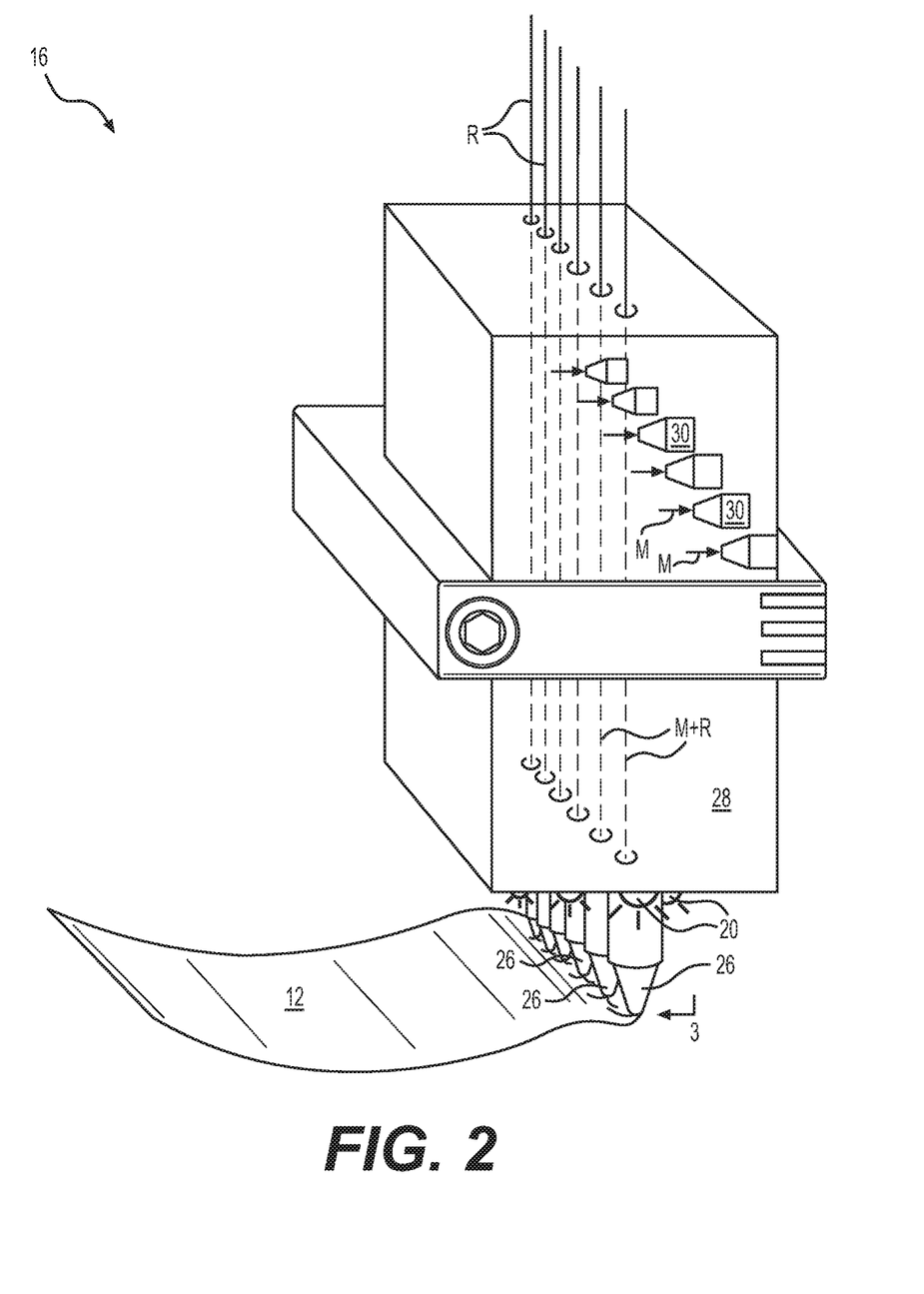
FIG. 2 is a diagrammatic illustration of an exemplary disclosed head that may be utilized with the manufacturing system of FIG. 1.

An exemplary head 16 is disclosed in detail in FIG. 2. Head 16 may include, among other things, a plurality of nozzles 26 that are fluidly connected to the lower end of a common matrix reservoir 28. In the disclosed embodiment, nozzles 26 are located immediately adjacent each other, arranged in a generally straight line, and at least partially surrounded by cure enhancers 20. It is contemplated, however, that nozzles 26 could be spaced apart and/or arranged in an arc, a complete circle, or another configuration, if desired. Any number of reinforcements (represented as R in FIG. 2) may be received at an opposing upper end of reservoir 28, passed axially through reservoir 28 where at least some matrix-impregnation occurs (matrix represented as M in FIG. 2), and discharged from head 16 via any number of separate nozzles 26. In the disclosed embodiment, the separate nozzles 26 may be located close enough to each other that a ribbon or sheet of composite material is created during curing by cure enhancers 20. In some applications, it may be helpful for a tip end of each nozzle 26 to have a divergent shape (see FIG. 2) to facilitate coalescing of the different matrix-coated fibers into the ribbon or sheet of composite material. For similar reasons, nozzles 26 may also be followed by a compactor (e.g., a flexible multi-part compactor—not shown), if desired.

The matrix impregnation of the reinforcements may occur in several different ways. For example, matrix reservoir 28 could be at least partially filled with matrix such that, as the reinforcements are pulled and/or pushed through reservoir 28, the reinforcements are submerged and soaked in the matrix. Additionally or alternatively, one or more matrix jets 30 (e.g., one matrix jet 30 for each strand, tow, or ribbon of reinforcement) may be located within matrix reservoir 28. Jets 30 may be configured to spray the strands and/or tows of reinforcement with matrix during passage of the reinforcements through matrix reservoir 28. This spraying of reinforcement with matrix may function to separate individual fibers, such that a more even or deeper penetration of the matrix within the reinforcements may occur. In addition, the separate jets 30 may allow for more precise control over an amount of matrix that coats each strand, tow, and/or ribbon. For example, a matrix flow rate of individual jets 30 may be correlated with a linear travel rate of the corresponding reinforcements through matrix reservoir 28, which can vary depending on reinforcement location (e.g., inside or outside location) during cornering of head 16.

Figure 3:
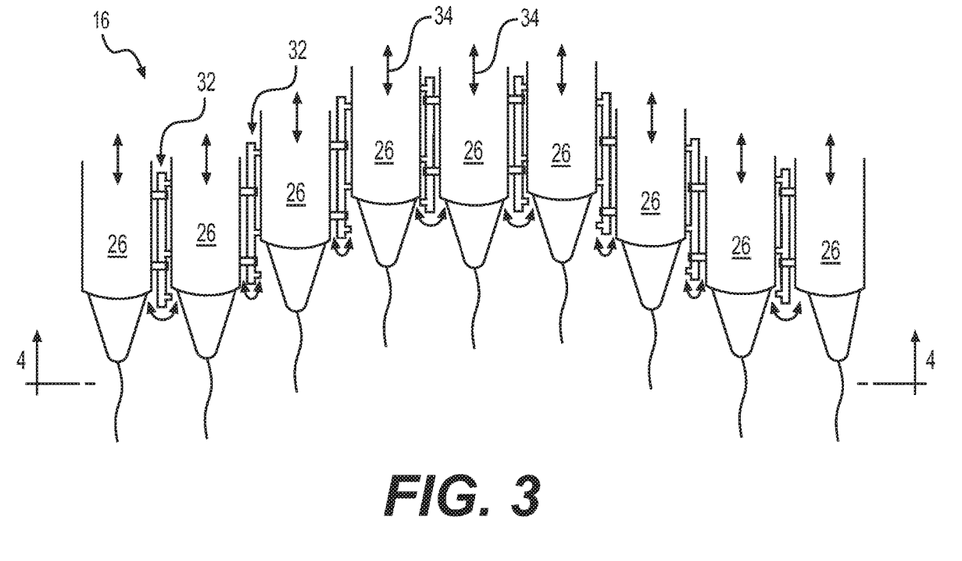
FIGS. 3 and 4 are diagrammatic illustrations of exemplary disclosed nozzle arrangements that may be used in conjunction with the head of FIG. 2.

As shown in FIG. 3, nozzles 26 of head 16 may include unique features that cooperate to accommodate multi-dimensional print surfaces and/or to produce multi-faceted structures 12. For example, nozzles 26 may be connected to each other by way of a plurality of hinges 32 that allow nozzles 26 to be moved out of a straight-line relationship. In particular, hinges 32 may allow for pivoting of nozzle axes relative to each other, as well as the linear raising and lowering of nozzle tips relative to each other. When head 16 travels axially relative to a print surface (see, for example, FIG. 3), the pivoting of the nozzle axis may allow for fabrication of a C-, V-, and/or S-shaped cross-sections of structure 12. When head 16 travels orthogonally relative to the print surface (see, for example, FIG. 2), the linear raising and/or lowering of the nozzle tips may allow for the print surface to have a corrugated texture.

One or more actuators 34 (e.g., linear and/or rotary actuators) may be associated with hinges 32 and configured to automatically make adjustments to the arrangement of nozzles 26 when selectively energized by controller 24 (referring to FIG. 1). These adjustments may include relative pivoting of nozzles 26 and/or raising and lowering, as desired. For example, controller 24 may selectively energize one or more actuators 34 based on specifications for structure 12 that are stored in memory and/or in coordination with movements of head 16 caused by support 14. In one embodiment, the adjustments may be implemented to create particular facets of structure 12. In another embodiment, the adjustments may be implemented to discharge material on top of an irregular print surface.

It is contemplated that nozzles 26 may additionally or alternatively be moveable based only on interaction with a print surface (e.g., without the use of any actuators 34), if desired. For example, nozzles 26 may be biased (e.g., via a spring or hydraulic pressure) to a baseline position, and moveable away from the baseline position when printing over an uneven surface.

Figure 4:
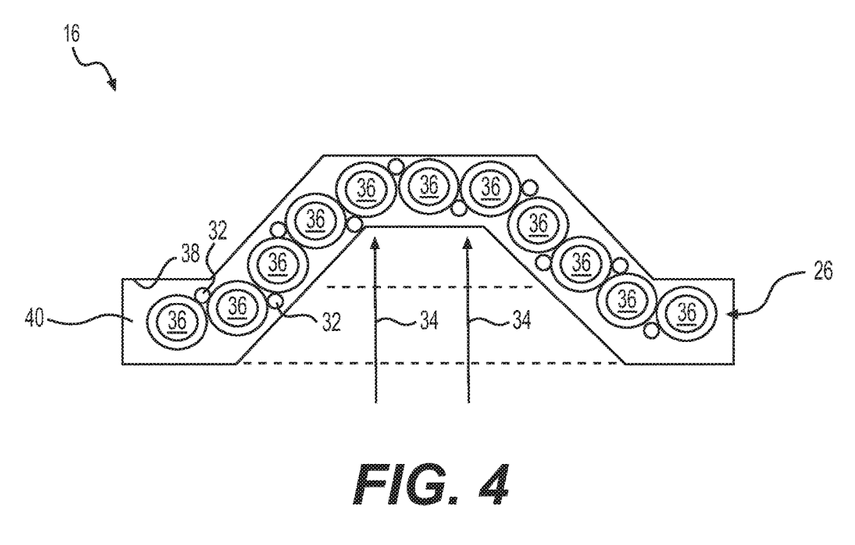

FIG. 4 illustrates another embodiment of head 16. In this embodiment, instead of separate nozzles 26, a single nozzle 26 may be included that has a plurality of separate internal channels 36. Like the nozzles 26 of FIG. 3, the channels 36 of FIG. 4 may be linked to each other via hinges 32 and selectively moved relative to each other via actuators 34, such that a flexible chain of channels 36 is created. Actuator(s) 34 may be located to selectively exert a transverse force (e.g., a pushing or pulling force oriented generally perpendicular relative to a flow direction through nozzle 26) against one or more links of the flexible chain, thereby changing a shape of the chain. When actuators 34 are not engaged with the flexible chain, the flexible chain may be generally straight (see dashed lines in FIG. 4), and the material being discharged from head 16 may resemble a generally flat ribbon. However, when one or more actuators 34 are caused by controller 24 to engage the flexible chain, the flexible chain may be caused to bow or shift (see solid lines in FIG. 4) and produce corresponding contours within structure 12.

In one embodiment, nozzle 26 of FIG. 4 includes a flexible outer membrane 38 that surrounds channels 36. Membrane 38 may be filled with a smart fluid (e.g., a magnetorheological fluid) 40 that, when energized (e.g., when exposed to a magnetic field or a voltage potential), increases in viscosity and can even become a solid. Controller 24 may selectively de-energize the fluid to relax membrane 38 during movements of actuator(s) 34, and thereafter re-energize the fluid such that membrane 38 again becomes rigid in the new configuration caused by the movement of actuator(s) 34. In this manner, membrane 38 may help to provide consistent contour control during fabrication of structure 12.

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix material. In addition, the disclosed heads may allow cooperative fabrication of complex structures via multiple nozzles and/or channels. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, density stipulations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

Installation of the reinforcements may be performed by passing the reinforcements down through matrix reservoir 28, and then threading the reinforcements through any separate nozzles 26 and/or channels 36 that exist. Installation of the matrix material may include filling head 16 and/or coupling of an extruder (not shown) to head 16.

Head 16 may then be moved by support 14 under the regulation of controller 22 to cause matrix-coated reinforcements to be placed against or on a corresponding anchor point 18. Cure enhancers 20 may then be selectively activated to cause hardening of the matrix material surrounding the reinforcements, thereby bonding the reinforcements to anchor point 18.

The component information may then be used to control operation of systems 10 and 12. For example, the reinforcements may be pulled and/or pushed from head 16 (along with the matrix material), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass through nozzle(s) 26 and join together to form a continuous ribbon or sheet of material. Actuator(s) 34 may be selectively energized by controller 22, such that the continuous ribbon or sheet of material has a desired cross-sectional shape and/or outer contour. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A head for an additive manufacturing system, comprising:
   a matrix reservoir;
   a plurality of nozzles simultaneously fluidly connected to the matrix reservoir; and
   at least one hinge connecting the plurality of nozzles to each other and having a pivot axis that is generally parallel with longitudinal axes of the plurality of nozzles and configured to allow the plurality of nozzles to pivot relative to each other.

2. The head of claim 1, wherein the at least one hinge further facilitates sliding of the plurality of nozzles along the pivot axis relative to each other.

3. The head of claim 1, further including at least one actuator configured to move the plurality of nozzles about the pivot axis of the at least one hinge.

4. The head of claim 1, wherein:
   the matrix reservoir is configured to separately receive a plurality of continuous reinforcements; and
   the plurality of nozzles are configured to consolidate the separately received continuous reinforcements together with matrix from the matrix reservoir into at least one of a ribbon or a sheet of composite material.

5. The head of claim 4, further including at least one cure enhancer connected at a location adjacent the plurality of nozzles and configured to cure the matrix in the at least one of the ribbon or the sheet of composite material.

6. The head of claim 1, further including at least one jet configured to spray a matrix against at least one of a ribbon and a sheet to form a composite material inside of the matrix reservoir.

7. A head for an additive manufacturing system, comprising:
   a matrix reservoir configured to separately receive a plurality of continuous reinforcements;
   at least one outlet fluidly connected to the matrix reservoir; and
   a plurality of jets, located inside of the matrix reservoir and each being separately associated with a different one of the plurality of continuous reinforcements.

8. The head of claim 7, wherein each of the plurality of jets is configured to spray the matrix towards a corresponding one of the plurality of continuous reinforcements.

9. A head for an additive manufacturing system, comprising:
   a matrix reservoir;
   a plurality of channels simultaneously fluidly connected to the matrix reservoir;
   at least one hinge connecting the plurality of channels to each other, the at least one hinge having a pivot axis generally parallel with longitudinal axes of the plurality of channels; and
   a flexible membrane at least partially surrounding the plurality of channels.

10. The head of claim 9, wherein the flexible membrane is at least partially filled with a smart fluid having a viscosity that changes when energized.

11. The head of claim 9, further including at least one actuator configured to move the plurality of channels relative to each other about the pivot axis of at least one hinge.

12. The head of claim 9, further including at least one cure enhancer connected at a location adjacent the plurality of channels and configured to cure a matrix that coats continuous reinforcements discharging from the plurality of channels.

13. The head of claim 12, further including at least one jet configured to spray the matrix against at least one continuous reinforcement at a location inside of the matrix reservoir.

14. An additive manufacturing system, comprising:
   a moveable support;
   a print head connected to an end of the moveable support and including:
      a matrix reservoir;
      a plurality of channels simultaneously fluidly connected to an end of the matrix reservoir opposite the moveable support;
      at least one hinge connecting the plurality of channels to each other, the at least one hinge having a pivot axis generally parallel with longitudinal axes of the plurality of channels;
      at least one actuator configured to move the plurality of channels relative to each other about the pivot axis of the at least one hinge;

a flexible membrane at least partially surrounding the plurality of channels; and at least one cure enhancer mounted adjacent the plurality of channels; and a controller in communication with moveable support, the at least one actuator, and the at least one cure enhancer, the controller being configured to regulate operation of the moveable support, the at least one actuator, and the at least one cure enhancer based on known specifications for a structure to be fabricated by the additive manufacturing system.

15. The additive manufacturing system of claim 14, wherein the flexible membrane is at least partially filled with a smart fluid having a viscosity that changes when energized.

16. The additive manufacturing system of claim 14, further including a plurality of jets each configured to spray a matrix toward a corresponding one of a plurality of continuous reinforcements passing through the matrix reservoir, wherein the controller is configured to regulate matrix spraying of each of the plurality of jets to a rate related to a travel speed of the corresponding one of the plurality of continuous reinforcements.

* * * * *